US011968676B2

(12) United States Patent
Li et al.

(10) Patent No.: US 11,968,676 B2
(45) Date of Patent: Apr. 23, 2024

(54) UPLINK CONTROL INFORMATION TRANSMISSION METHOD AND TERMINAL

(71) Applicant: VIVO MOBILE COMMUNICATION CO., LTD., Guangdong (CN)

(72) Inventors: Na Li, Dongguan (CN); Xiaodong Shen, Dongguan (CN); Zhi Lu, Dongguan (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 399 days.

(21) Appl. No.: 17/356,890

(22) Filed: Jun. 24, 2021

(65) Prior Publication Data

US 2021/0321394 A1    Oct. 14, 2021

Related U.S. Application Data

(63) Continuation of application No. PCT/CN2019/126572, filed on Dec. 19, 2019.

(30) Foreign Application Priority Data

Dec. 25, 2018  (CN) .......................... 201811594137.9

(51) Int. Cl.
*H04W 72/04*    (2023.01)
*H04W 72/044*   (2023.01)
(Continued)

(52) U.S. Cl.
CPC ....... *H04W 72/21* (2023.01); *H04W 72/0446* (2013.01); *H04W 72/0466* (2013.01);
(Continued)

(58) Field of Classification Search
CPC ..... H04W 72/21; H04W 72/56; H04W 72/23; H04W 72/0446; H04W 72/0466; H04W 72/1263
See application file for complete search history.

(56) References Cited

U.S. PATENT DOCUMENTS 10,805,910 B2 * 10/2020 Yang ..................... H04L 1/0041
10,959,189 B2    3/2021 Blankenship et al.
(Continued)

FOREIGN PATENT DOCUMENTS

CA    3046451 A1 *  6/2018  ............... H04L 1/00
CN    102170647 A     8/2011
(Continued)

OTHER PUBLICATIONS

International Search Report and Written Opinion of the International Searching Authority regarding International Patent Application No. PCT/CN2019/126572, dated Feb. 25, 2020. Translation provided by Bohui Intellectual Property.
(Continued)

*Primary Examiner* — Derrick V Rose
(74) *Attorney, Agent, or Firm* — Harness, Dickey & Pierce, P.L.C.

(57) ABSTRACT

An UCI transmission method includes: when UCI having different priorities is transmitted on the same target channel, encoding the UCI having different priorities respectively and then transmitting same on the target channel, wherein the priorities of the UCI are determined by information contained in target parameters of DCI and/or in UCI, the DCI being DCI corresponding to being used for indicating the transmission of the UCI.

9 Claims, 3 Drawing Sheets

(51) Int. Cl.
*H04W 72/0446* (2023.01)
*H04W 72/10* (2009.01)
*H04W 72/12* (2023.01)
*H04W 72/1263* (2023.01)
*H04W 72/21* (2023.01)
*H04W 72/23* (2023.01)
*H04W 72/56* (2023.01)

(52) U.S. Cl.
CPC ....... *H04W 72/1263* (2013.01); *H04W 72/23* (2023.01); *H04W 72/56* (2023.01)

(56) References Cited

U.S. PATENT DOCUMENTS

| | | | |
|---|---|---|---|
| 2017/0041921 | A1 | 2/2017 | Oketani |
| 2018/0167932 | A1 | 6/2018 | Papasakellariou |
| 2018/0278380 | A1 | 9/2018 | Kim et al. |
| 2018/0302896 | A1 | 10/2018 | Nayeb Nazar et al. |
| 2019/0215823 | A1* | 7/2019 | Kim .................. H04L 1/18 |
| 2019/0363843 | A1* | 11/2019 | Gordaychik ......... H04L 1/08 |
| 2020/0236673 | A1* | 7/2020 | Xu .................. H04W 72/21 |
| 2021/0360610 | A1* | 11/2021 | Kim .................. H04L 5/0094 |
| 2021/0377991 | A1 | 12/2021 | Takeda et al. |

FOREIGN PATENT DOCUMENTS

| | | |
|---|---|---|
| CN | 103391628 A | 11/2013 |
| CN | 107113740 A | 8/2017 |
| JP | WO2019130522 A1 | 12/2020 |
| WO | WO-2015107600 A1 | 7/2015 |
| WO | WO-2017122959 A1 | 7/2017 |
| WO | WO-2017189034 A1 | 11/2017 |

OTHER PUBLICATIONS

First Office Action regarding Chinese Patent Application No. 201811594137.9, dated Dec. 3, 2020. Translation provided by Bohui Intellectual Property.
Second Office Action regarding Chinese Patent Application No. 201811594137.9, dated May 19, 2021. Translation provided by Bohui Intellectual Property.
"UCI enhancements for URLLC," Huawei, HiSilicon, 3GPP TSG RAN WG1 Meeting #95, R1-1812222, Nov. 16, 2018.
"Potential UCI enhancements for URLLC," InterDigital, Inc., 3GPP TSG RAN WG1 Meeting #95, R1-1813163, Nov. 16, 2018.
Supplementary European Search Report regarding Patent Application No. 19901441.6-1216/3905570; PCT/CN2019/126572, dated Jan. 19, 2022.
"UCI enhancement for URLLC," OPPO, 3GPP TSG RAN WG1 Meeting #95, R1-1812816, dated Nov. 16, 2018.
First Office Action regarding Japanese Patent Application No. 2021-535231, dated Jun. 30, 2022. Translation provided by Bohui Intellectual Property.
First Office Action regarding Korean Patent Application No. 10-2021-7021383, dated Sep. 26, 2022. Translation provided by Bohui Intellectual Property.
First Office Action regarding European Patent Application No. 19901441.6-1206, dated Jun. 29, 2023.
"Discussion on flexible HARQ scheduling for URLLC," Institute for Information Industry (III), 3GPP TSG RAN WG1 Meeting #95, R1-1813284, dated Nov. 16, 2018.
"UCI enhancements for URLLC," Huawei, HiSilicon, 3GPP TSG RAN WG1 Meeting #95, R1-1813986, dated Nov. 16, 2018.
3GPP TS 38.213 v15.3.0 (Sep. 2018) 3rd Generation Partnership Project; Technical Specification Group Radio Access Network; NR; Physical layer procedures for control (Release 15).

* cited by examiner

UPLINK CONTROL INFORMATION TRANSMISSION METHOD AND TERMINAL

CROSS-REFERENCE TO RELATED APPLICATIONS

This application is a Bypass Continuation Application of PCT/CN2019/126572 filed on Dec. 19, 2019, which claims priority to Chinese Patent Application No. 201811594137.9 filed on Dec. 25, 2018, which are incorporated herein by reference in their entirety.

TECHNICAL FIELD

This disclosure relates to the field of communications technologies, and in particular, to an uplink control information (UCI) transmission method and a terminal.

BACKGROUND

Compared with previous mobile communications systems, future 5G mobile communications systems need to adapt to more diversified scenarios and service requirements. Main 5G scenarios include: enhanced mobile broadband (eMBB), ultra-reliable and low-latency communications (URLLC), and massive machine type communications (mMTC). These scenarios require a system to provide high reliability, low latency, large bandwidth, wide coverage, and so on. For terminals supporting URLLC ultra-reliable and low latency services, to achieve higher reliability, a lower code rate is required for transmitting data, and faster and more accurate channel state information (CSI) feedback is also required. In addition, for some terminals that might support services with different numerologies, the terminals support not only ultra-reliable and low-latency URLLC services, but also large-capacity and high-rate eMBB services. Different types of reliability requirements are mainly embodied in different block error rate targets (BLER targets) and latency requirements.

SUMMARY

Embodiments of this disclosure provide an UCI transmission method, applied to a terminal and including:

in a case that pieces of UCI of different priorities are to be transmitted on a same target channel, coding the pieces of UCI of different priorities respectively and transmitting the coded pieces of UCI on the target channel.

A priority of the UCI is determined by a target parameter of downlink control information (DCI) and/or information contained in the UCI, and the DCI is used to indicate DCI corresponding to transmission of the UCI.

An embodiment of this disclosure further provides a terminal, including:

a coding and transmission module, configured to, in a case that pieces of UCI of different priorities are to be transmitted on a same target channel, code the pieces of UCI of different priorities respectively and transmit the coded pieces of UCI on the target channel.

A priority of the UCI is determined by a target parameter of DCI and/or information contained in the UCI, and the DCI is used to indicate DCI corresponding to transmission of the UCI.

An embodiment of this disclosure further provides a terminal, including a processor, a memory, and a computer program stored in the memory and capable of running on the processor, where when the computer program is executed by the processor, the steps of the foregoing UCI transmission method are implemented.

An embodiment of this disclosure further provides a non-transitory computer-readable storage medium, where the non-transitory computer-readable storage medium stores a computer program, and when the computer program is executed by a processor, the steps of the foregoing UCI transmission method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings

DESCRIPTION OF EMBODIMENTS

Figure 1:
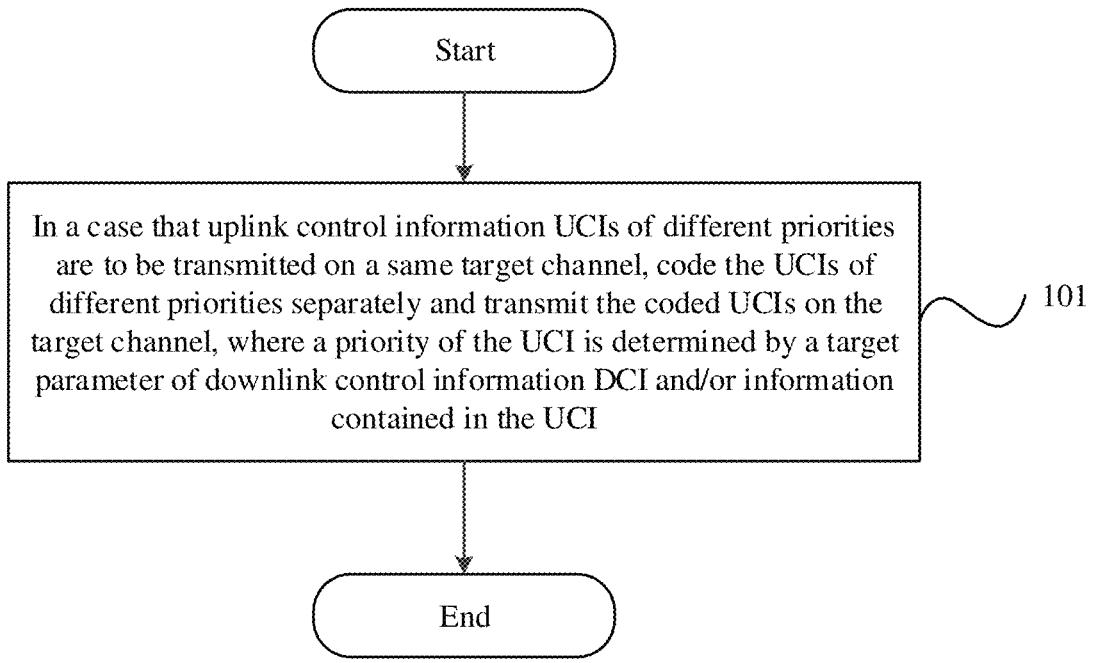
FIG. 1 is a schematic diagram of steps of an UCI transmission method according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The term "and/or" in this specification describes only an association relationship for describing associated objects and represents that three relationships may exist. For example, A and/or B may represent the following three cases: Only A exists, both A and B exist, and only B exists.

In new radio (NR) R15, each physical uplink control channel (PUCCH) resource is configured with corresponding maxcoderate (maximum code rate) and nrofPRBs (maximum number of physical resource blocks) by radio resource control (RRC). When a terminal transmits UCI on the PUCCH, required physical resource blocks (PRB) (<=nrofPRBs) are determined based on payload size and maxcoderate so that an actual transmission code rate is less than or equal to maxcoderate. If a code rate at which the terminal uses all PRBs is still higher than the configured maximum code rate, the terminal needs to drop part of the UCI according to a specified rule. Different code rates can adapt to different channel states and meet different BLER target requirements. For example, if a BLER target is relatively low (for example, $10^{-5}$), a relatively low code rate is required. On the contrary, if a BLER target is relatively high (for example, $10^{-2}$), a higher code rate can be used to reduce resources used and improve resource utilization.

In NR R15, when a PUCCH and a physical uplink shared channel (PUSCH) are overlapped in time domain, if time-multiplexing requirements are satisfied, UCI content on the PUCCH is multiplexed by the terminal into the PUSCH for transmission. When the UCI is to be transmitted on the PUSCH, the terminal determines, through beta_offset (resource occupation ratio offset value) configured by RRC or indicated by DCI, the number of resource elements (RE) occupied by the UCI to be transmitted on the PUSCH, and performs encoding and rate matching based on the number of REs.

For terminals that support both URLLC and eMBB services, different codebooks may be used to send hybrid automatic repeat request acknowledgment (HARQ-ACK) feedback for physical downlink shared channels (PDSCH) of URLLC and eMBB services on different PUCCH resources. When collision between different PUCCHs occurs, if a HARQ-ACK on a PUCCH is dropped, a base station needs to retransmit its corresponding PDSCH, which may greatly reduce downlink throughput. Therefore, it is necessary to consider multiplexing HARQ-ACKs on different PUCCHs into one PUCCH. Because there is only one maxcoderate for one PUCCH, if the maxcoderate is a code rate for URLLC, eMBB feedback requires more resources, resulting in a waste of resources. If the maxcoderate is a code rate for eMBB, reliability of URLLC feedback cannot be guaranteed. Similarly, for terminals that support both URLLC and eMBB services, if a same codebook is usable to send HARQ-ACK feedback for PDSCHs of URLLC and eMBB on a same PUCCH resource, it is also necessary to consider coding when UCI of different types of services are multiplexed.

As shown in FIG. 1, an embodiment of this disclosure provides an UCI transmission method, applied to a terminal and including:

Step 101. In a case that pieces of UCI of different priorities are to be transmitted on a same target channel, code the pieces of UCI of different priorities respectively and transmit the coded pieces of UCI on the target channel.

A priority of the UCI is determined by a target parameter of DCI and/or information contained in the UCI, and the DCI is used to indicate DCI corresponding to transmission of the UCI.

Optionally, the target parameter of the DCI includes at least one of:

a DCI format;
a radio network temporary identity (RNTI) corresponding to the DCI;
a control resource set (CORESET) corresponding to the DCI;
a search space corresponding to the DCI;
a modulation and coding scheme (MCS) table corresponding to the DCI;
priority indication information carried in the DCI;
scrambled bit information corresponding to the DCI;
resource indication information carried in the DCI, where the resource indication information is used to indicate a time domain resource and/or a frequency domain resource for transmission of data or control information; or
information carried in the DCI and used to indicate a pilot mapping type for transmission of data or control information.

For example, corresponding DCI used to indicate transmission of high-priority UCI is DCI described below:

DCI of a specified DCI format;
DCI scrambled with a specified RNTI (for example, an MCS-C-RNTI); and
DCI in which a configured MCS uses a low spectral efficiency MCS table (for example, MCS table index 3, MCS table index 3).

In this case, corresponding DCI used to indicate transmission of low-priority UCI is DCI described below:

DCI of a DCI format other than the foregoing specified DCI format;
DCI scrambled with an RNTI other than the foregoing specified RNTI; and
DCI in which a configured MCS does not use a low spectral efficiency MCS table.

Information contained in the UCI includes HARQ-ACK, CSI, a scheduling request (SR), and the like.

Optionally, the priority of UCI may also be referred as being associated with a type of service of the UCI. For example, UCI for an eMBB service and UCI for a URLLC service are pieces of UCI of different priorities.

It should be noted that target parameters of corresponding DCI that are used to indicate transmission of the pieces of UCI of different types of services are different. For example, if a format of the DCI used to indicate transmission of the UCI for an eMBB service is DCI format 1, and a format of the DCI used to indicate transmission of the UCI for a URLLC service is DCI format 2, the terminal may determine different priorities of the pieces of UCI of different types of services based on the different DCI formats.

Optionally, in the foregoing embodiment of this disclosure, the target channel includes: a PUCCH or a PUSCH.

As one embodiment, in a case that the target channel is a PUCCH, the method further includes:

in a case that the pieces of UCI of different priorities are coded respectively, using different code rates for the pieces of UCI of different priorities.

Correspondingly, the method further includes:
determining code rates used for the pieces of UCI of different priorities based on a first scaling factor and a code rate corresponding to a PUCCH resource;
or,
determining code rates used for the pieces of UCI of different priorities based on code rates that correspond to the pieces of UCI of different priorities configured by RRC.

The first scaling factor is configured by RRC, or indicated by DCI, or defined in a protocol. Optionally, the code rate corresponding to the above PUCCH resource is a code rate configured by a network-side device for the PUCCH resource through RRC signaling.

For example, a network-side device configures different code rates for the PUCCH resource through RRC signaling, and pieces of UCI of different priorities correspond to different code rates.

For another example, high-priority UCI uses a code rate corresponding to the PUCCH resource, and low-priority UCI uses a code rate that is a product of the code rate corresponding to the PUCCH resource times a first scaling factor. In this case, the first scaling factor is less than 1.

For a further example, low-priority UCI uses a code rate corresponding to the PUCCH resource, and high-priority UCI uses a code rate that is a product of the code rate corresponding to the PUCCH resource times a first scaling factor. In this case, the first scaling factor is greater than 1.

As another optional embodiment, in a case that the target channel is a PUCCH, and priorities of the pieces of UCI include at least a first priority and a second priority, the method further includes:

in a case that the pieces of UCI of different priorities are coded respectively, allocating resources for transmission of UCI of the first priority based on a code rate configured by RRC, and allocating remaining resources for transmission of UCI of the second priority, which means that UCI of the first priority and UCI of the second priority jointly use the number of PRBs configured by RRC.

The first priority is higher than the second priority.

For example, in a case that the pieces of UCI of different priorities are coded respectively, UCI of the first priority uses the maximum code rate configured by RRC to determine REs required to transmit the UCI of the first priority, and remaining REs other than the REs required to transmit the UCI of the first priority in physical resource blocks configured by RRC are determined to be used to transmit the UCI of the second priority.

When the remaining resources are insufficient to transmit UCI of the second priority, entire or part of the UCI of the second priority is dropped for transmission. When part of the UCI is dropped, it is dropped according to a configured or predefined UCI dropping rule. For example, CSI part 2 (second part of CSI) is dropped first, then CSI part 1 (first part of CSI), and then HARQ-ACK or SR.

As another embodiment, in a case that the target channel is a PUCCH, the step 101 includes:

coding the pieces of UCI of different priorities respectively, mapping the coded pieces of UCI of different priorities to physical resources by using a time domain-first mapping method, and transmitting the coded pieces of UCI on the target channel.

For example, pieces of UCI of different priorities are low-priority HARQ-ACK (for example, eMBB HARQ-ACK) and high-priority HARQ-ACK (for example, URLLC HARQ-ACK). In a case that the low-priority HARQ-ACK and the high-priority HARQ-ACK are multiplexed together, if the terminal fails to detect a PDCCH corresponding to the last PDSCH of the low-priority service (for example, eMBB service), a base station and the terminal may have inconsistent understanding of the number of bits for the low-priority HARQ-ACK, and PRB resources used by PUCCHs are inconsistent. Therefore, in order to reduce the impact of missing detection of a low-priority PDCCH on the high-priority HARQ-ACK feedback, the high-priority HARQ-ACK and low-priority HARQ-ACK are coded respectively, and mapped to physical resources by using a time domain-first method, which can ensure that the base station correctly receives the high-priority HARQ-ACK feedback.

It should be noted that for UCI that is mapped to physical resources by using a time domain-first mapping method, code rates and/or beta_offsets of pieces of UCI are not limited in the embodiments of this disclosure, that is, for pieces of UCI of different priorities that are transmitted by using the time domain-first mapping mode, when pieces of UCI of different priorities are coded respectively, a same code rate may be used, or different code rates may be used, and a same beta_offset may be used, or different beta_offsets may be used.

Figure 2:
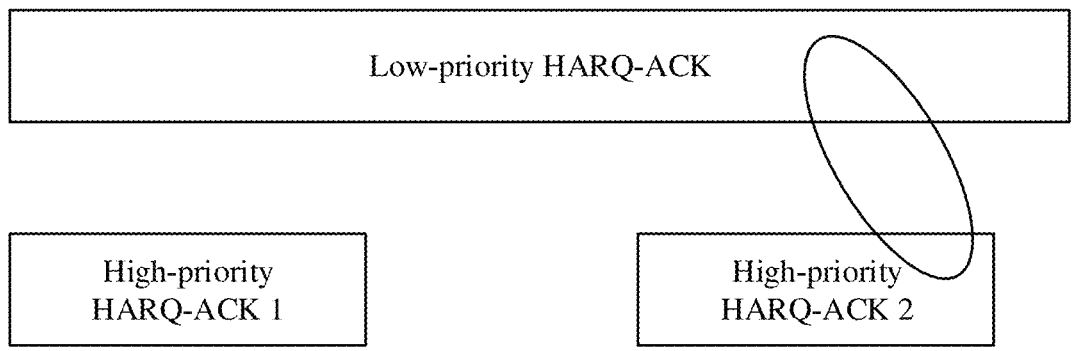
FIG. 2 is a schematic diagram of an example in an UCI transmission method according to an embodiment of this disclosure.

As shown in FIG. 2, a PUCCH carrying low-priority HARQ-ACK is overlapped in time with a plurality of time-division multiplexed PUCCHs carrying high-priority HARQ-ACK (HARQ-ACK 1 and HARQ-ACK 2). To reduce feedback delay of the high priority HARQ-ACK, the low-priority HARQ-ACK is multiplexed on a high-priority PUCCH, and in consideration of terminal processing time, the low-priority HARQ-ACK is multiplexed with the first one of the high-priority PUCCHs that meets a time condition for multiplexing.

When the low-priority HARQ-ACK and high-priority HARQ-ACK 2 are multiplexed on one PUCCH for transmission, the low-priority HARQ-ACK and the high-priority HARQ-ACK 2 are coded respectively, and use different code rates to determine the number of REs that they use. When the low-priority HARQ-ACK is multiplexed on a URLLC PUCCH for transmission, REs occupied by the high-priority HARQ-ACK2 are determined by using maxcoderate (maximum code rate) that corresponds to PUCCH resources and is configured by RRC, and eMBB HARQ uses a scaling factor (first scaling factor) specified in the protocol or configured by RRC to determine its code rate as maxcoderate×scaling factor, for example, the scaling factor=0.1. The terminal determines the number of PRBs to be used (the determined number of PRBs is less than or equal to a maximum number of PRBs for the PUCCH resources configured by RRC) based on the number of URLLC HARQ-ACK bits and its determined code rate, and the number of HARQ-ACK bits and its determined code rate.

If the above respective code rates still are exceeded even when the terminal uses the maximum number of PRBs for transmission (which indicates that more PRBs are required by the terminal), the terminal uses the maximum code rate for transmission of high-priority HARQ-ACK, and drops part of low-priority HARQ-ACK bits, or returns HARQ-ACK with a low-priority HARQ-ACK bit compression (for example, code block group (CBG)) granularity back to HARQ-ACK with a transmission block (TB) granularity (determining number of HARQ-ACK bits fed back according to the number of Tbs), or binds HARQ-ACK to meet a HARQ-ACK code rate requirement of eMBB.

Figure 3:
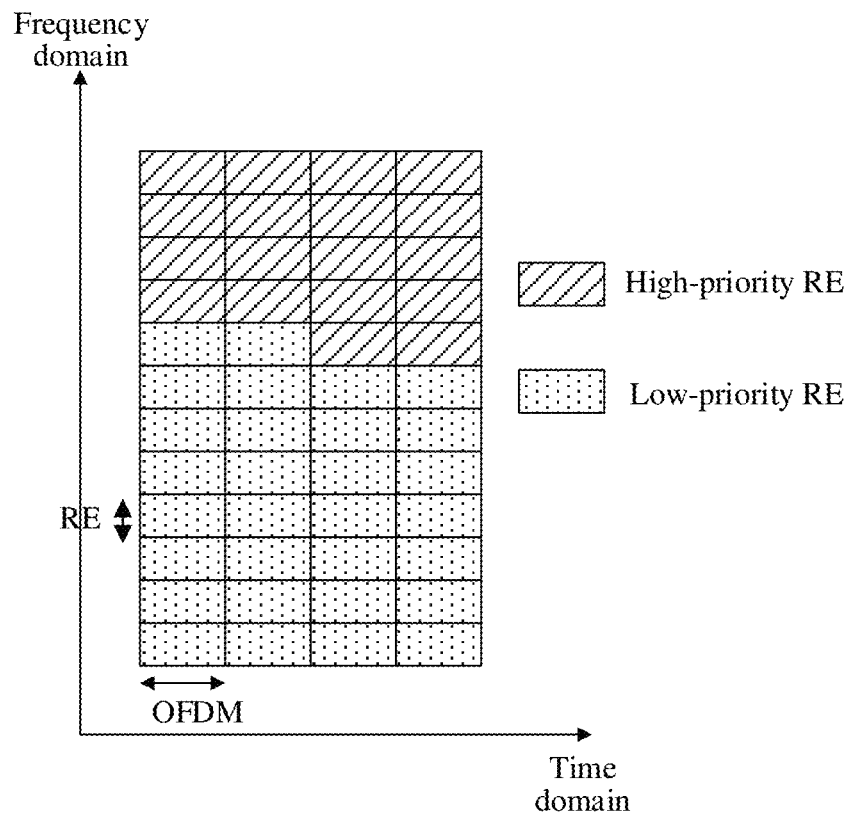
FIG. 3 is a schematic diagram of another example in an UCI transmission method according to an embodiment of this disclosure.

In addition, in case of PDSCH feedback, since it is necessary to feed back HARQ-ACK of a plurality of PDCCHs scheduling PDSCHs at the same time, in order to prevent detection of a PDCCH from being missed, a mechanism to counter downlink assignment index (counter DAI) is introduced to determine the number of HARQ-ACK bits that the terminal needs to feed back. However, detection of the last PDCCH may still be missed. In this way, the number of HARQ-ACK bits fed back by the terminal is inconsistent with the number of bits understood by the base station, causing the base station to fail to receive HARQ-ACK feedback correctly. For example, if a BLER target for a low-priority service is $10^{-2}$, and a BLER target for a high-priority service is $10^{-5/-6}$, then a probability of not detecting a low-priority PDCCH is 1%, and a probability of not detecting a high-priority PDCCH is 0.001%. Therefore, in a case that detection of the last low-priority PDCCH is missed, and low-priority HARQ-ACK and high-priority HARQ-ACK are multiplexed together, the base station and the terminal may have inconsistent understanding of the number of bits for HARQ-ACK, and PRB resources used by PUCCHs are inconsistent. Therefore, in order to reduce the impact of missing detection of a low-priority PDCCH on the high-priority HARQ-ACK feedback, as shown in FIG. 3, the high-priority HARQ-ACK and low-priority HARQ-ACK are coded respectively, and mapped to physical resources by using a time domain-first method, which ensures that the base station can correctly receive the high-priority HARQ-ACK feedback.

As another embodiment, in a case that the target channel is a PUSCH, the method further includes:

in a case that the pieces of UCI of different priorities are coded respectively, using different resource occupation ratio offset values beta_offsets for the pieces of UCI of different priorities, and determining REs and a code rate used for each UCI.

Correspondingly, the method further includes:

determining beta_offsets used for the pieces of UCI of different priorities based on a beta_offset configured by RRC or indicated by DCI and a preset beta_offset. For example, a beta_offset configured by RRC or indicated by DCI is used for high-priority UCI, and a preset beta_offset is used for low-priority UCI (a preset beta_offset is a fixed beta_offset), for example, the preset beta_offset is equal to 1. This method is generally suitable for multiplexing low-priority UCI and high-priority UCI onto a high-priority PUSCH;

or, determining beta_offsets used for the pieces of UCI of different priorities based on beta_offsets that correspond to the pieces of UCI of different priorities configured by RRC. For example, RRC configures a beta_offset for high-priority UCI and a beta_offset for low-priority UCI;

or, determining beta_offsets used for the pieces of UCI of different priorities based on beta_offsets that correspond to the pieces of UCI of different priorities indicated by DCI (for example, uplink grant (UL grant)). For example, DCI indicates a beta_offset for high-priority UCI and a beta_offset for low-priority UCI. For example, DCI indicates a beta_offset by using a form of table 1, where each state indicated by the beta_offset in the DCI indicates a beta_offset of a different priority (for example, a high-priority URLLC service and a low-priority eMMB service), and different UCI types (such as HARQ-ACK, CAI part 1, and CSI part 2) and number of bits (such as less than 3 bits, greater than 3 bits and less than 12 bits, greater than 11 bits, and so on) may be further included under the same priority. The priority may be determined based on a target parameter in DCI corresponding to the UCI transmission. $I_{offset,0}^{HARQ-ACK}$, $I_{offset,1}^{HARQ-ACK}$, and $I_{offset,2}^{HARQ-ACK}$ in the table respectively represent an index corresponding to HARQ-ACK less than or equal to 2 bits, an index corresponding to HARQ-ACK greater than 2 bits and less than 12 bits, an index corresponding to HARQ-ACK greater than 11 bits, $I_{offset,0}^{CSI-1}$ and $I_{offset,0}^{CSI-2}$ respectively represent an index corresponding to CSI part 1 less than or equal to 11 bits and an index corresponding to CSI part 2 less than or equal to 11 bits, and $I_{offset,1}^{CSI-1}$ and $I_{offset,1}^{CSI-2}$ respectively represent an index corresponding to CSI part 1 greater than 11 bits and an index corresponding to CSI part 2 greater than 11 bits;

TABLE 1

| beta_offset indicator | ($I_{offset,0}^{HARQ-ACK}$ or $I_{offset,1}^{HARQ-ACK}$ or $I_{offset,2}^{HARQ-ACK}$), ($I_{offset,0}^{CSI-1}$ or $I_{offset,0}^{CSI-2}$), ($I_{offset,1}^{CSI-1}$ or $I_{offset,1}^{CSI-2}$) for a low-priority service (for example, eMBB) | ($I_{offset,0}^{HARQ-ACK}$ or $I_{offset,1}^{HARQ-ACK}$ or $I_{offset,2}^{HARQ-ACK}$), ($I_{offset,0}^{CSI-1}$ or $I_{offset,0}^{CSI-2}$), ($I_{offset,1}^{CSI-1}$ or $I_{offset,1}^{CSI-2}$) for a high-priority service (for example, URLLC) |
|---|---|---|
| '00' | 1st offset index provided by higher layers | 1st offset index provided by higher layers |
| '01' | 2nd offset index provided by higher layers | 2nd offset index provided by higher layers |
| '10' | 3rd offset index provided by higher layers | 3rd offset index provided by higher layers |
| '11' | 4th offset index provided by higher layers | 4th offset index provided by higher layers | or, determining beta_offsets used for the pieces of UCI of different priorities based on a beta_offset that corresponds to UCI of a first priority and is indicated by DCI and a beta_offset that corresponds to UCI of a second priority and is configured by RRC, where the priorities of the pieces of UCI include at least the first priority and the second priority. For example, a beta_offset for low-priority UCI is configured by RRC, and a beta_offset for high-priority UCI is indicated by DCI;

or, determining beta_offsets used for the pieces of UCI of different priorities based on a second scaling factor and a beta_offset for UCI of a first priority that is configured by RRC or indicated by DCI, where the second scaling factor is configured by RRC, or indicated by DCI, or defined in a protocol. For example, a beta_offset for high-priority UCI is configured by RRC or indicated by DCI, and a beta_offset for low-priority UCI is equal to a product of the beta_offset configured by RRC or indicated by DCI times the second scaling factor. For another example, a beta_offset for low-priority UCI is configured by RRC or indicated by DCI, and a beta_offset for high-priority UCI is equal to a product of the beta_offset configured by RRC or indicated by DCI times the second scaling factor.

Figure 4:
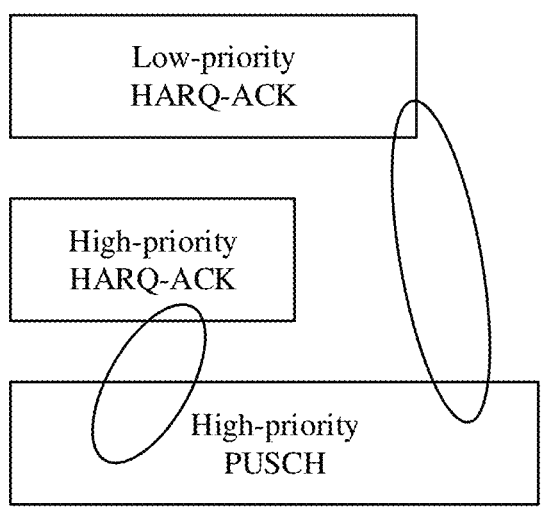
FIG. 4 is a schematic diagram of a further example in an UCI transmission method according to an embodiment of this disclosure.

As shown in FIG. 4, low-priority HARQ-ACK, high-priority HARQ-ACK, and a high-priority PUSCH are overlapped in time domain. The low-priority HARQ-ACK and the high-priority HARQ-ACK are multiplexed on a PUSCH, and the terminal uses different beta_offsets to determine REs occupied by the high-priority HARQ-ACK and the low-priority HARQ-ACK. The beta_offset corresponding to the high-priority HARQ-ACK is greater than the beta_offset corresponding to the high-priority HARQ-ACK, and the low-priority HARQ-ACK and the high-priority HARQ-ACK are coded and mapped, respectively.

As an implementation, the above-mentioned high-priority HARQ-ACK may be URLLC HARQ-ACK, and the low-priority HARQ-ACK may be eMBB HARQ-ACK.

The above-mentioned high-priority UCI may be URLLC CSI, and the low-priority UCI may be eMBB CSI.

The above-mentioned high-priority UCI may be URLLC CSI, and the low-priority UCI may be eMBB HARQ-ACK.

As another implementation, a HARQ-ACK priority is determined based on a DCI format, a control resource set, and/or a search space, and the like. The method for determining priorities of the pieces of UCI has been described in detail in the foregoing embodiments, and details are not be described herein.

To sum up, the foregoing embodiments of this disclosure may achieve reliability of high-priority UCI and improve resource utilization by defining or configuring coding schemes and code rates for the pieces of UCI of different priorities to be transmitted on the same target channel.

Figure 5:
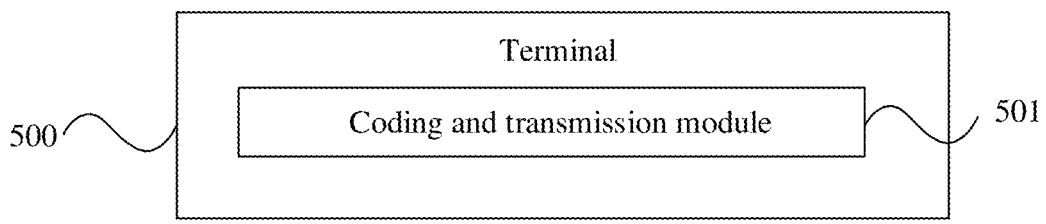
FIG. 5 is a first schematic structural diagram of a terminal according to an embodiment of this disclosure.

As shown in FIG. 5, an embodiment of this disclosure further provides a terminal 500, including:

a coding and transmission module 501, configured to, in a case that pieces of UCI of different priorities are to be transmitted on a same target channel, code the pieces of UCI of different priorities respectively and transmit the coded pieces of UCI on the target channel.

A priority of the UCI is determined by a target parameter of DCI and/or information contained in the UCI, and the DCI is used to indicate DCI corresponding to transmission of the UCI.

Optionally, in the foregoing embodiment of this disclosure, the target channel includes: a PUCCH or a PUSCH.

Optionally, in the foregoing embodiment of this disclosure, the terminal further includes:

a first coding module, configured to, in a case that the target channel is a PUCCH, use different code rates for the pieces of UCI of different priorities in a case that the pieces of UCI of different priorities are coded respectively.

Optionally, in the foregoing embodiment of this disclosure, the terminal further includes:

a code rate determining module, configured to determine code rates used for the pieces of UCI of different priorities based on a first scaling factor and a code rate corresponding to a PUCCH resource; or determine code rates used for the pieces of UCI of different priorities based on code rates that correspond to the pieces of UCI of different priorities configured by RRC, where the first scaling factor is configured by RRC, or indicated by DCI, or defined in a protocol.

Optionally, in the foregoing embodiment of this disclosure, the terminal further includes:

a second coding module, configured to, in a case that the target channel is a PUCCH, and the priorities of the pieces of UCI include at least a first priority and a second priority, in a case that the pieces of UCI of different priorities are coded respectively, allocate resources for transmission of UCI of the first priority based on a code rate configured by RRC, and allocate remaining resources for transmission of UCI of the second priority.

The first priority is higher than the second priority.

Optionally, in the foregoing embodiment of this disclosure, the coding and transmission module includes:

a coding and transmission submodule, configured to code the pieces of UCI of different priorities respectively, map the coded pieces of UCI of different priorities to physical resources by using a time domain-first mapping method, and transmit the coded pieces of UCI on the target channel.

Optionally, in the foregoing embodiment of this disclosure, the terminal further includes:

a third coding module, configured to, in a case that the target channel is a PUSCH, in a case that the pieces of UCI of different priorities are coded respectively, use different resource occupation ratio offset values beta_offsets for the pieces of UCI of different priorities, and determine resource elements and a code rate used for each UCI.

Optionally, in the foregoing embodiment of this disclosure, the terminal further includes:

an offset value determining module, configured to determine beta_offsets used for the pieces of UCI of different priorities based on a beta_offset configured by RRC or indicated by DCI and a preset beta_offset;

or, configured to determine beta_offsets used for the pieces of UCI of different priorities based on beta_offsets that correspond to the pieces of UCI of different priorities configured by RRC;

or, configured to determine beta_offsets used for the pieces of UCI of different priorities based on beta_offsets that correspond to the pieces of UCI of different priorities indicated by DCI;

or, configured to determine beta_offsets used for the pieces of UCI of different priorities based on a beta_offset that corresponds to UCI of a first priority and is indicated by DCI and a beta_offset that corresponds to UCI of a second priority and is configured by RRC, where the priorities of the pieces of UCI include at least the first priority and the second priority;

or, configured to determine beta_offsets used for the pieces of UCI of different priorities based on a second scaling factor and a beta_offset for UCI of a first priority that is configured by RRC or indicated by DCI, where the second scaling factor is configured by RRC, or indicated by DCI, or defined in a protocol.

The terminal provided in this embodiment of this disclosure is capable of implementing various processes that are implemented by the terminal in the method embodiments of FIG. 1 to FIG. 4. To avoid repetition, details are not described herein.

To sum up, the foregoing embodiment of this disclosure may achieve reliability of high-priority UCI and improve resource utilization by defining or configuring coding schemes and code rates for the pieces of UCI of different priorities to be transmitted on the same target channel.

It should be noted that the terminal provided in this embodiment of this disclosure is a terminal capable of executing the foregoing UCI transmission method, and all the embodiments of the foregoing UCI transmission method are applicable to the terminal, with the same or similar beneficial effects achieved.

Figure 6:
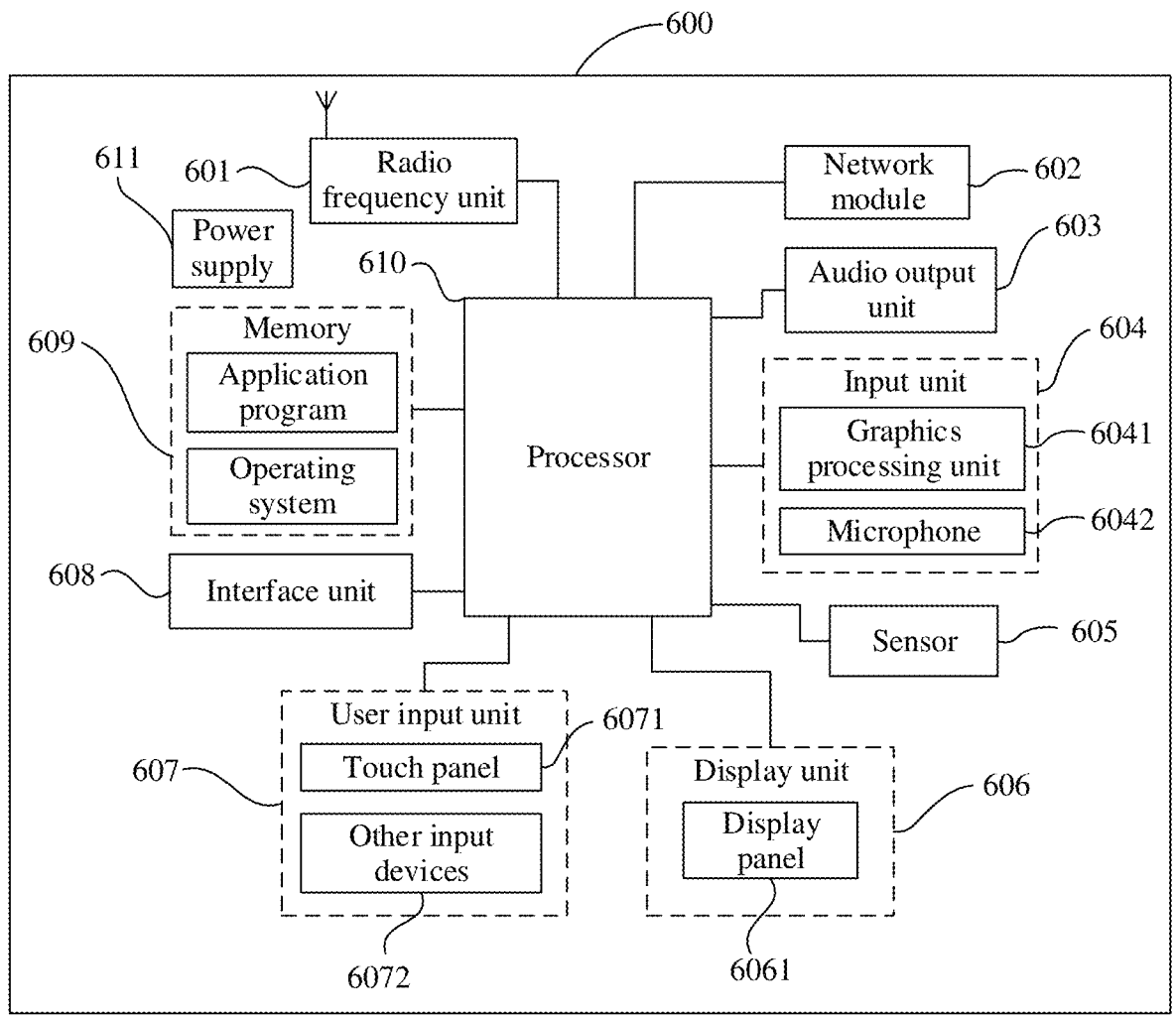
FIG. 6 is a second schematic structural diagram of a terminal according to an embodiment of this disclosure.

FIG. 6 is a schematic diagram of a hardware structure of a terminal for implementing the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 610 is configured to, in a case that pieces of UCI of different priorities are to be transmitted on a same target channel, code the pieces of UCI of different priorities respectively.

The radio frequency unit 601 is configured to transmit the pieces of UCI of different priorities on the target channel after coding the pieces of UCI respectively.

A priority of the UCI is determined by a target parameter of DCI and/or information contained in the UCI, and the DCI is used to indicate DCI corresponding to transmission of the UCI.

To sum up, the foregoing embodiment of this disclosure may achieve reliability of high-priority UCI and improve resource utilization by defining or configuring coding schemes and code rates for the pieces of UCI of different priorities to be transmitted on the same target channel.

It should be noted that the terminal provided in this embodiment of this disclosure is a terminal capable of executing the foregoing UCI transmission method, and all the embodiments of the foregoing UCI transmission method are applicable to the terminal, with the same or similar beneficial effects achieved.

It should be understood that, in this embodiment of this disclosure, the radio frequency unit 601 may be configured to transmit or receive a signal in an information transmitting/receiving or call process. For example, the radio frequency unit 601 receives downlink data from a base station, transmits the downlink data to the processor 610 for processing, and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal, and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a receiver, and the like.

The input unit 604 is configured to receive an audio signal or a video signal. The input unit 604 may include a graphics processing unit (GPU) 6041 and a microphone 6042. The graphics processing unit 6041 processes image data of a static picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 may receive a sound, and can process the sound into audio data. The processed audio data may be converted in a telephone call mode into a format that can be transmitted by the radio frequency unit 601 to a mobile communications base station, for outputting.

The terminal 600 may further include at least one sensor 605, for example, an optical sensor, a motion sensor, and another sensor. For example the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the terminal (for example, switching between landscape and portrait, related games, and magnetometer posture calibration), vibration recognition related functions (for example, a pedometer and stroke), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include the display panel 6061. Optionally, the display panel 6061 may be configured in a form of a liquid crystal display (LCD), an organic light-emitting diode (OLED), or the like.

The user input unit 607 may be configured to receive input digit or character information, and generate key signal input that is related to user setting and function control of the terminal. For example, the user input unit 607 includes a touch panel 6071 and other input devices 6072. The touch panel 6071 is also referred to as a touchscreen and can collect a touch operation of a user on or near the touch panel 6071 (for example, an operation performed by the user on the touch panel 6071 or near the touch panel 6071 with a finger or by using any appropriate object or accessory such as a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 610, and receives and executes a command transmitted by the processor 610. In addition, the touch panel 6071 may be implemented in a plurality of types, for example, as a resistive, capacitive, infrared, or surface acoustic wave touch panel. In addition to the touch panel 6071, the user input unit 607 may further include the other input devices 6072. For example, the other input devices 6072 may include but are not limited to a physical keyboard, a function key (such as a volume control key or a power on/off key), a trackball, a mouse, a joystick, and the like. Details are not described herein.

Optionally, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 serve as two separate parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, and may further include a non-volatile memory such as a disk storage device, a flash memory device, or another volatile solid-state storage device.

The processor 610 is a control center of the terminal, connects various parts of the entire terminal by using various interfaces and lines, and executes various functions and data processing of the terminal by running or executing a software program and/or a module stored in the memory 609 and invoking data stored in the memory 609, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor, a memory, and a computer program stored in the memory and capable of running on the processor. When the computer program is executed by the processor, the processes of the foregoing embodiments of the UCI transmission method are implemented, with the same technical effects achieved. To avoid repetition, details are not described herein.

An embodiment of this disclosure further provides a non-transitory computer-readable storage medium, where the non-transitory computer-readable storage medium stores a computer program. When the computer program is executed by a processor, the processes of the foregoing embodiments of the UCI transmission method are implemented, with the same technical effects achieved. To avoid repetition, details are not described herein. For example, the computer-readable storage medium is a read-only memory (ROM), a random access memory (RAM), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some elements may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a non-transitory computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a non-transitory computer-readable storage medium. When the program runs, the processes of the methods in the embodiments are performed. The storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (ASIC), digital signal processors (DSP), digital signal processing devices (DSPD), PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, a person of ordinary skill in the art may develop many other forms without departing from principles of this disclosure and the protection scope of the claims, and all such forms shall fall within the protection scope of this disclosure.

The foregoing descriptions are only specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. An uplink control information (UCI) transmission method, comprising:
in a case that pieces of UCI of different priorities are to be transmitted on a same target channel, coding, by a terminal, the pieces of UCI of different priorities respectively and transmitting, by the terminal, the coded pieces of UCI on the target channel, wherein
a priority of the UCI is determined by a target parameter of downlink control information (DCI) and/or information contained in the UCI, the DCI is used to indicate DCI corresponding to transmission of the UCI, and the target channel comprise a physical uplink control channel (PUCCH); wherein
the method further comprises:
in a case that the pieces of UCI of different priorities are coded respectively, using, by the terminal, different code rates for the pieces of UCI of different priorities; and
the method further comprises:
determining, by the terminal, code rates used for the pieces of UCI of different priorities based on a first scaling factor and a code rate corresponding to a PUCCH resource, wherein the first scaling factor is configured by radio resource control (RRC), or indicated by DCI, or defined in a protocol; or
determining, by the terminal, code rates used for the pieces of UCI of different priorities based on code rates that correspond to the pieces of UCI of different priorities configured by radio resource control (RRC).

2. The method according to claim 1, wherein in a case that the priorities of the pieces of UCI comprise at least a first priority and a second priority, the method further comprises:
in a case that the pieces of UCI of different priorities are coded respectively, allocating, by the terminal, resources for transmission of UCI of the first priority based on a code rate configured by RRC, and allocating, by the terminal, remaining resources for transmission of UCI of the second priority, wherein
the first priority is higher than the second priority.

3. The method according to claim 1, wherein the coding, by the terminal, the pieces of UCI of different priorities respectively and transmitting, by the terminal, the coded pieces of UCI on the target channel comprises:
coding, by the terminal, the pieces of UCI of different priorities respectively, mapping, by the terminal, the coded pieces of UCI of different priorities to physical resources by using a time domain-first mapping method, and transmitting, by the terminal, the coded pieces of UCI on the target channel.

4. A terminal, comprising a processor, a memory, and a computer program stored in the memory and executable on the processor, wherein the computer program, when executed by the processor, causes the processor to perform:
in a case that pieces of uplink control information (UCI) of different priorities are to be transmitted on a same target channel, coding the pieces of UCI of different priorities respectively and transmitting the coded pieces of UCI on the target channel, wherein
a priority of the UCI is determined by a target parameter of downlink control information (DCI) and/or information contained in the UCI, the DCI is used to indicate DCI corresponding to transmission of the UCI, and the target channel comprises a physical uplink control channel (PUCCH); and
the computer program, when executed by the processor, causes the processor to perform:
in a case that the pieces of UCI of different priorities are coded respectively, using different code rates for the pieces of UCI of different priorities; and
the computer program, when executed by the processor, causes the processor to perform:
determining code rates used for the pieces of UCI of different priorities based on a first scaling factor and a code rate corresponding to a PUCCH resource, wherein the first scaling factor is configured by radio resource control (RRC), or indicated by DCI, or defined in a protocol; or
determining code rates used for the pieces of UCI of different priorities based on code rates that correspond to the pieces of UCI of different priorities configured by radio resource control (RRC).

5. The terminal according to claim 4, wherein in a case that the priorities of the pieces of UCI comprise at least a first priority and a second priority, the computer program, when executed by the processor, causes the processor to perform:
in a case that the pieces of UCI of different priorities are coded respectively, allocating resources for transmission of UCI of the first priority based on a code rate configured by RRC, and allocating remaining resources for transmission of UCI of the second priority, wherein the first priority is higher than the second priority.

6. The terminal according to claim 4, wherein the computer program, when executed by the processor, causes the processor to perform:
coding the pieces of UCI of different priorities respectively, mapping the coded pieces of UCI of different priorities to physical resources by using a time domain-first mapping method, and transmitting the coded pieces of UCI on the target channel.

7. A non-transitory computer-readable storage medium, wherein the non-transitory computer-readable storage medium stores a computer program, and the computer program, when executed by a processor, causes the processor to perform:
in a case that pieces of uplink control information (UCI) of different priorities are to be transmitted on a same target channel, coding the pieces of UCI of different priorities respectively and transmitting, the coded pieces of UCI on the target channel, wherein
a priority of the UCI is determined by a target parameter of downlink control information (DCI) and/or information contained in the UCI, the DCI is used to indicate DCI corresponding to transmission of the UCI, and the target channel comprises a physical uplink control channel (PUCCH); and
the computer program, when executed by the processor, causes the processor to perform:
in a case that the pieces of UCI of different priorities are coded respectively, using different code rates for the pieces of UCI of different priorities; and
the computer program, when executed by the processor, causes the processor to perform:
determining code rates used for the pieces of UCI of different priorities based on a first scaling factor and a code rate corresponding to a PUCCH resource, wherein the first scaling factor is configured by radio resource control (RRC), or indicated by DCI, or defined in a protocol; or
determining code rates used for the pieces of UCI of different priorities based on code rates that correspond to the pieces of UCI of different priorities configured by radio resource control (RRC).

8. The non-transitory computer-readable storage medium according to claim 7, wherein in a case that the priorities of the pieces of UCI comprise at least a first priority and a second priority, the computer program, when executed by a processor, causes the processor to perform:
in a case that the pieces of UCI of different priorities are coded respectively, allocating resources for transmission of UCI of the first priority based on a code rate configured by RRC, and allocating remaining resources for transmission of UCI of the second priority, wherein the first priority is higher than the second priority.

9. The non-transitory computer-readable storage medium according to claim 7, wherein the computer program, when executed by a processor, causes the processor to perform:
coding the pieces of UCI of different priorities respectively, mapping the coded pieces of UCI of different priorities to physical resources by using a time domain-first mapping method, and transmitting the coded pieces of UCI on the target channel.

* * * * *